T. H. JOHNSON.
METHOD OF LAYING CONCRETE PAVEMENTS.
APPLICATION FILED FEB. 15, 1917.
1,314,810.
Patented Sept. 2, 1919.
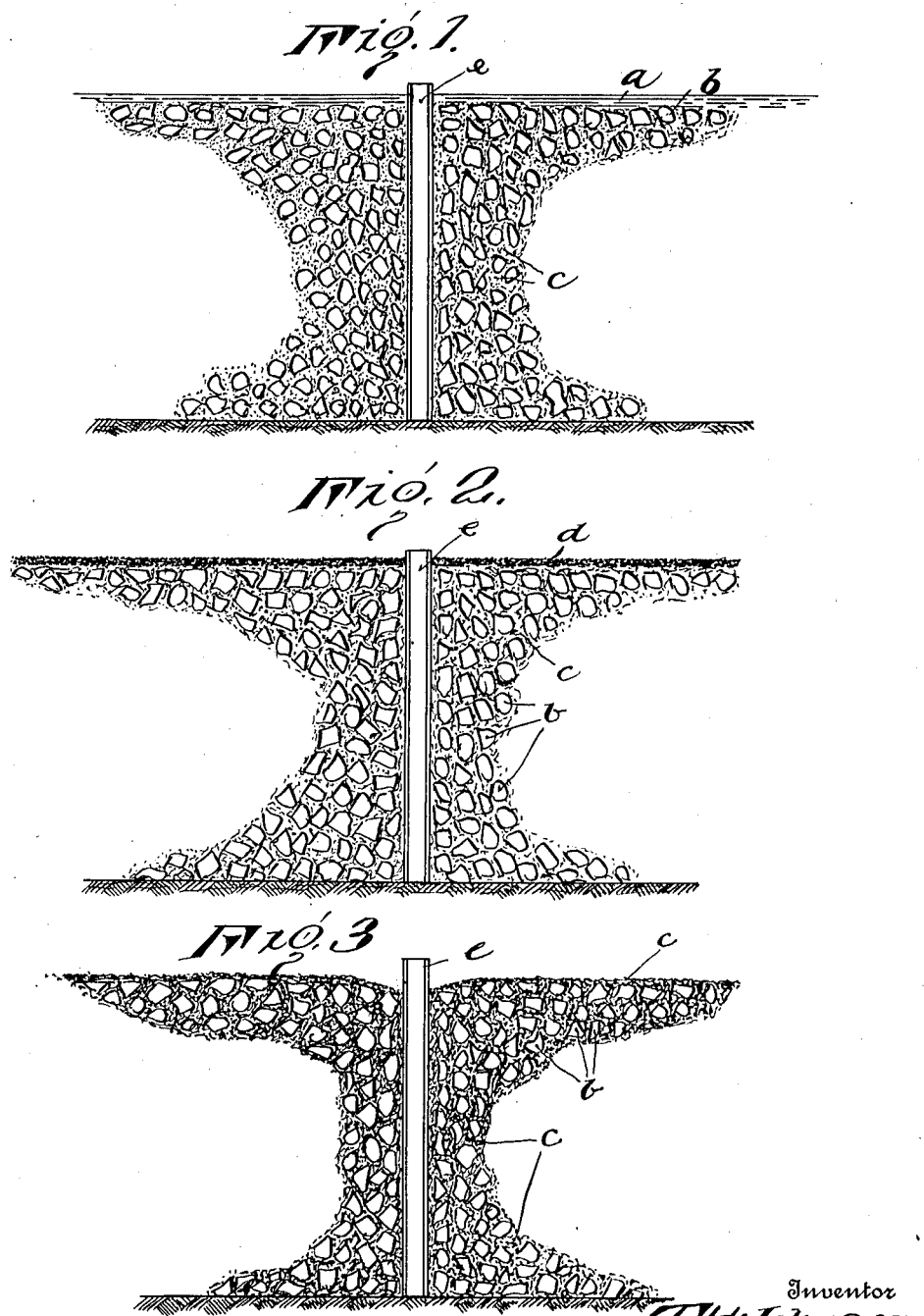
Inventor
T. H. Johnson

UNITED STATES PATENT OFFICE.

TELEMACHUS H. JOHNSON, OF SIOUX CITY, IOWA.

METHOD OF LAYING CONCRETE PAVEMENTS.

1,314,810. Specification of Letters Patent. Patented Sept. 2, 1919.

Application filed February 15, 1917. Serial No. 148,857.

*To all whom it may concern:*

Be it known that I, TELEMACHUS H. JOHNSON, a citizen of the United States, residing at Sioux City, in the county of Woodbury and State of Iowa, have invented certain new and useful Improvements in Methods of Laying Concrete Pavements, of which the following is a specification.

This invention contemplates a novel method of laying concrete pavements, side walks, and the like, and has as its object to disclose a method by the carrying out of which the pavement may be laid without experiencing the disadvantages attending the laying of such pavements by the ordinary methods and as a result of which method of laying the pavement will possess greater strength than a pavement laid by any of the ordinary methods but will combine those unusual qualities of density, toughness, and impermeability, without which concrete cannot be successfully used as a paving material. It will have the flat surfaces of the coarse aggregate located substantially parallel to the wearing surface of the pavement, will be more uniform in structure, will not be likely to absorb water, and will not be likely to "craze" and crack or otherwise disintegrate. Incidentally, the invention contemplates the disclosure of a method which will not require the use of a bridge in finishing the pavement, which will permit of the pavement being finished in less time than by other methods, will permit of beginning the finishing operation earlier and extending the same over a longer period of time, thereby giving more time for so acting upon the mass as to produce a more perfect hydration of the cement, to drive out the excess water, to close up all voids and cells, and through this manipulation, to impart to the concrete mass that degree of density, toughness, and impermeability, which is essential to a good concrete pavement. This method will also permit the use of a wetter mix which is highly desirable because of inevitable loss of water through absorption by the earth foundation and through evaporation into the atmosphere, and which losses cannot be accurately measured. The method is desirable also for the further reason that, while it is of the greatest importance, the quantity of water required to hydrate a given quantity of cement is not precisely known, but given the opportunity, cement will, because of its strong affinity for water, appropriate and retain just the right quantity for its proper hydration. Therefore, this method, by requiring the use of more water in mixing than is necessary to hydrate the cement, compensates for the inevitable loss by absorption, before mentioned, affords the cement the opportunity to appropriate the quantity of water it requires for its hydration, and then removes from the concrete mass the remaining free water, which if allowed to remain would be harmful to the pavement. This method will also prevent the accumulation of laitance and the ill effects flowing therefrom, will destroy all voids, and will result in a pavement of uniform density throughout, of gradually increasing richness in cement and strength from the foundation to the wearing surface, and tough and strongly resistant to fracture from direct impact and to the abrasive wear of traffic. Also by the method it is contemplated that the pavement be given a relatively rough surface without, however having to resort to the ordinary brooming.

It is a generally recognized fact that expansion and contraction are the agencies, more than wear of traffic, that are destructive of concrete pavements and that this expansion and contraction is due more to the absorption and evaporation of water than to the ordinary temperature variations. The ordinary concrete pavement as laid by the usual methods has many cells or voids and this is especially true of the base portion of the pavement. That is to say, the pavement laid by the ordinary methods will have a dense impervious top or wearing stratum and a porous absorptive base or lower stratum. Thus in a period of rainy weather the earth foundation becomes saturated and the base or lower stratum of the pavement absorbs the water and expands whereas the dense impervious top or wearing stratum dries rapidly and contracts. Thus two opposing forces are set up in the pavement and as a result the pavement will crack and disintegration sets in along the natural joints thus formed in the pavement due to traffic and to the freezing and thawing of water flowing into the said joints or cracks. In the ordinary methods of laying concrete there is employed a quantity of water in excess of that required for the hydration of the cement and after the pavement has been laid, because no way is provided for the removal of this excess water except its elimination by natural processes a portion of it will be absorbed by the earth foundation, and as it percolates downwardly it takes along with it into the earth foundation a portion of the fine cement thus leaving the base of the pavement leaner in cement, porous and brittle. The remaining portion of this excess water will remain distributed throughout the mass until removed by evaporation, resulting in an open porous, and friable concrete. Furthermore, in any event the cells or voids above mentioned result from the ordinary method of laying. From the foregoing it will be appreciated that if a method of laying is followed by which the excess of water in the mix is removed by being drawn upwardly through the mix instead of being permitted to be absorbed by the earth foundation, and that if by such method the formation of cells or voids is prevented as also the accumulation of laitance, a pavement will be produced which will be uniformly dense from bottom to top throughout, and devoid of cells or voids such as above referred to. Because of the agitation of the mass produced by the continued action of the heavy floats in forcing out the water and closing up the voids, the cement will be thoroughly saturated, and together with the sand and coarse aggregate will be puddled into a dense compact mass which will set slowly and form a hard, tough, and impervious pavement. It is contemplated that by the method of the present invention these results shall be secured as well as others which will be readily observed and hereinafter referred to.

In the accompanying drawings:

Figure 1 is a view illustrating a section through a pavement in condition as laid by the first step in the method;

Fig. 2 is a similar view illustrating the second step;

Fig. 3 is a similar view illustrating the finished pavement.

It is conceived, and demonstrated by experiment, that the thinner the coating of cement given each particle of the fine aggregate, and the less the separation between the particles of the coarse aggregate, other things being equal, the stronger will be the resulting concrete. That is, that the nearer the finer material comes to just filling the voids in the next coarser material, the better the result. In my mixture a very slight margin of safety is allowed over what is required to fill the voids, in the proportions one part by measure of cement, to two and a half parts of sand and five parts of crushed rock or gravel, in contrast with the mixture used in ordinary methods, of one part by measure of cement, to one and one half parts sand and three parts crushed rock or gravel. This excessively rich mixture is the result of the erroneous conception that the dense, hard, tough, impervious quality we impart to our pavement by the excessive labor expended upon it may be imparted by increasing the proportion of cement. It is known that the richer the mortar, the more rapid the setting, the more heat generated and the greater liability to shrinkage cracks.

It is also known that a slow setting, cool mixture produces the strongest concrete. My improved method, using the leaner mix, avoids this economic waste amounting to approximately 40% of the cement used, and at the same time produces better results.

In preparing the pavement for laying, I place in a revolving mixing drum a mixture of approximately one part cement, by measure, two and one-half parts of sand and five parts of hard crushed rock or gravel in sizes preferably between one quarter inch and two inches, together with a sufficient volume of water to render the mixture of such consistency that it will flatten or settle without tamping when dumping upon the ground. The mixing drum is then revolved at a suitable rate of speed for a sufficient length of time to thoroughly mix the material after which the mixture is dumped upon the foundation and is leveled and graded to the proper crown, the entire thickness of the pavement being placed at a single operation. After being thus placed the material is compacted by rubbing the surface thereof with heavy floats, the float first employed having a smooth surface. As a result of this floating the coarse aggregate has its flat faces brought to position substantially parallel to the wearing surface of the pavement thus producing a better wearing surface and permitting of carrying out the subsequent steps in the method without disturbing the coarse particles constituting the aggregate. Also as a result of this floating the mass is compacted and a portion of the surplus water is brought to the surface, the voids which would otherwise form within the mass being at the same time destroyed. As the water rises through the mass toward the surface a portion of the fine cement is carried upwardly by it to or substantially to the said surface. As before pointed out in the ordinary methods now followed the surplus or excess water is permitted to be absorbed by the earth foundation or be eliminated by evaporation and in either event there are voids formed in the mass and in the first instance, that is to say, when this excess water is absorbed by the earth foundation, a quantity of fine cement in the mixture is carried downwardly below the base of the pavement into the earth foundation and lost. In carrying out the method of the present invention, however, the pressure imposed upon the mass during the floating operation causes the free or excess water to rise to the surface and at the same time closes up the spaces from which this excess water has been driven, and expels all air bubbles which would eventually become cells or voids within the mass. As stated above, the excess water as it rises to the surface of the mass carries with it a quantity of the fine cement of the mixture and thus the pavement becomes richer and stronger at and adjacent the surface than at and adjacent the base, although there is, as will be readily understood, no well defined line of demarcation between the richer and leaner portions of the mass. It will further be understood that so far as this first step in the method is concerned the use of a mixture containing an excess of water or, in other words, a greater percentage of water than is necessary for the hydration of the cement, permits of the mixture being more readily placed upon the foundation, obviates tamping, and makes the pavement more uniform and this excess water being then withdrawn, the pavement is made denser and stronger.

The next step in the method consists in preparing a mixture of equal parts of cement and sand, together with hydrated lime in quantity equal to about 4% of the weight of the cement employed, and of this prepared mixture there is deposited upon the surface of the pavement subsequent to the first step above described, a sufficient quantity to absorb the excess water, a portion of which will lie in a film upon the surface of the concrete mass, as indicated by the reference letter $a$ in Fig. 1 of the drawings, the coarse aggregate being indicated by the reference letter $b$ and the cement and sand by the letter $c$. A few minutes after the placing of the dry mixture of cement, sand and hydrated lime, the floating operation is repeated with a float having a corrugated surface so designed as to thoroughly mix the mortar formed by the dry mixture and the excess water brought to the surface by it through capillary attraction, and during and as a result of the first described floating operation, and to incorporate this mortar intimately with the upper stratum of the mass. Subsequent to floating with the corrugated float, the mass is repeatedly floated with smooth heavy floats and as a result the cement will become thoroughly hydrated and the final setting and the drying out and hardening of the surface of the pavement as a whole will be retarded. Furthermore, these repeated floatings with heavy floats will further serve to compact the mass and drive out any remaining free water and air and create a stronger bond between the coarse aggregate and the surrounding mortar. As a further result of these repeated floatings, in connection with the retarding of the final setting, the pavement is hardened and toughened and made impervious. Furthermore, as, toward the end of this step of repeated floating, the mixture begins to set, it will adhere to a greater or less degree to the floats as they are pushed and pulled over the surface of the pavement, and this adhesion of the mass to the float transmits the surface action of the float through the entire depth of the pavement, producing a kneading effect, closing up all possible voids, forcing the aggregates into closer contact, compacting and bonding the concrete into a dense, close-grained mass, free from excess moisture and air, and in the best possible condition to take the final "set", producing a pavement, hard, dense, tough, and impervious. A further result of this adhesion to the floats is the roughening of the surface of the pavement, thereby making the pavement more suitable for traffic, being roughened to the desired degree and yet presenting no sharp edges such as result from brooming. As a result of the application of the dry cementitious mixture to the moist surface, and the layer of which material is indicated at $d$ in Fig. 2, the accumulation of laitance in the film of water at the surface of the mass is prevented or destroyed and the injurious effects which result from this laitance are obviated. It will also be understood that by the addition to the surface of the dry cementitious mixture that the subsequent floating thereof may be accomplished without disturbing the coarse particles comprising the aggregate. It will also be understood that inasmuch as the wearing surface of the pavement is very dense and compact, it will be impervious and therefore will be more sanitary and further will be less liable to disintegration through expansion and contraction. It is to be understood, of course, that not only will the dry mixture of cement, sand and hydrated lime absorb or take up the excess of water upon the surface of the mass when applied thereto but that due to the affinity of the lime and cement for water, these substances will extract any free water left remaining in the body of the mass after the first floating operation. Also by increasing the bond between the mortar and the coarse aggregate, the concrete is given sufficient strength to prevent its pulling apart when, after having expanded, it shrinks or contracts to its normal position. In order to further provide against absorption of water by the base of the pavement from the earth foundation, the surface of the earth foundation may be treated by the application thereto of any suitable water-proof substance or compound or by interposing between the foundation and the base of the pavement a waterproofed sheet or membrane, such, for example, as paper.

The last step in the method consists in providing the pavement at suitable intervals with a joint and one of the said joints is illustrated in the drawings and indicated by the reference letter e. This joint is in the nature of a membrane which extends vertically the entire depth of the pavement and preferably about an inch above the surface and the edges of the pavement at the joints, or in other words, at the opposite sides of the membrane, are finished with an edging tool for the purpose of imparting additional richness of cement to these portions of the pavement, which portions are liable to the greatest strain. Thus, at the joints the pavement is hardened and rendered denser than at other points and to prevent the edges receiving direct impact through traffic, they are, in being finished, slightly depressed or inclined downwardly toward the said membrane. It will be understood that in time the upper edge of the membrane will be hammered down by the traffic thereby preventing the entrance of water to the base of the pavement through the said joint.

Having thus described the invention, what is claimed as new is:

1. That method of laying a concrete pavement or the like which includes the steps of preparing a very wet mix having about 15 per cent. of water in excess of that required for the hydration of the cement content, acting upon the mass, when laid, to bring the excess water to the surface, applying to the surface a layer of dry highly absorptive cementitious material in quantity sufficient to absorb the excess water, and working the surface to incorporate the said layer intimately in the upper stratum of the mass.

2. That method of laying a concrete pavement or the like which includes the steps of preparing a wet mix having a percentage of water in excess of that required for the hydration of the cement content, floating the mass when laid, applying to the surface a layer of dry cementitious material in quantity sufficient to absorb the excess water, and again floating until the mix begins to set.

3. That method of laying a concrete pavement or the like which includes the steps of preparing a wet mix having a percentage of water in excess of that required for the hydration of the cement employed, acting upon the mass when laid with heavy floats, applying to the surface a layer of dry and absorptive cementitious material in quantity sufficient to absorb the excess water, and then repeatedly floating to compact the pavement and expel all air bubbles until the mix begins to set and until the said layer of cementitious material has been incorporated in the upper stratum of the mix.

4. That method of preparing and laying a concrete pavement or the like which includes the steps of preparing a wet mix of cement, sand, a coarse aggregate, and water in excess of the amount required for the hydration of the cement, acting upon the mix when laid to bring the excess water to the surface, applying to the surface a layer of a dry cementitious material in quantity sufficient to absorb the excess water, and then repeatedly floating the mix until the same begins to set.

5. That method of laying a concrete pavement or the like which includes the steps of preparing a wet mix having a percentage of water in excess of that required for the hydration of the cement employed, introducing into the wet mix a partition membrane to form a joint, acting upon the mix to bring the excess water to the surface, applying to the surface a layer of a dry cementitious material in quantity sufficient to absorb the excess water, floating the mix to intimately incorporate the said layer of cementitious material in the upper strata of the mix and troweling or edging and depressing the surface of the pavement immediately at the opposite sides of the membrane to provide the said pavement at the said points with a wear portion possessing a greater degree of hardness than the remaining wear surface of the pavement.

6. That method of laying a concrete pavement or the like which includes the steps of preparing a concrete mixture containing a sufficient volume of water to render the same of such consistency that it will flatten or settle without tamping when dumped, compacting the mix by moving a heavy float over the surface thereof, applying to the surface of the mix a moisture-absorbing cementitious material, and repeating the floating operation whereby to incorporate the said cementitious material intimately with the upper strata of the mix and continuing the floating operation until the whole begins to set.

7. That method of laying a concrete pavement or the like which includes the steps of preparing a concrete mixture containing a sufficient volume of water to render the same of such consistency that it will flatten or settle without tamping when dumped, compacting the mix by moving a heavy float over the surface thereof, the float having a smooth surface, applying to the surface of the mix a moisture-absorbing cementitious material, and repeating the floating operation, with a float having a roughened surface whereby to incorporate the said cementitious material intimately with the upper strata of the mix and continuing the floating operation until the whole begins to set.

8. That method of laying a concrete pavement which includes the steps of preparing a mix of cement, sand, and aggregate together with water in volume in excess of that required to hydrate the cement content of the mix and sufficient to render the mix of such consistency that it will flatten or settle without tamping when dumped, dumping the mix *in situ* and leveling the same, floating the mix by the movement of a float over its surface whereby to compact the mix, to bring the coarse aggregate to position with the flat faces of its particles substantially parallel to the surface, and to bring a portion of the surplus water to the surface and at the same time destroying the voids by expelling the air from the mix, preparing and applying to the surface of the mix a moisture-absorbing cementitious material consisting of cement, sand, and hydrated lime, in proportions and total volume to absorb the excess moisture, repeating the floating operation to intimately incorporate the said moisture-absorbing cementitious material with the concrete mix and continuing the said floating operation until the material begins to adhere to the floats.

In testimony whereof I affix my signature.

TELEMACHUS H. JOHNSON. [L. S.]